United States Patent [19]

Tolson

[11] Patent Number: 4,479,309
[45] Date of Patent: Oct. 30, 1984

[54] METHOD AND APPARATUS FOR DRYING CEREAL GRAIN

[76] Inventor: Raymond C. Tolson, 1194 Devonshire, Greenville, Miss. 38701

[21] Appl. No.: 365,168

[22] Filed: Apr. 5, 1982

[51] Int. Cl.³ .............................................. F26B 3/14
[52] U.S. Cl. .......................................... 34/13; 34/28; 34/168; 34/174
[58] Field of Search ................ 34/65, 64, 48, 54, 168, 34/169, 174, 170, 34, 13, 28

[56] References Cited

U.S. PATENT DOCUMENTS

| | | | |
|---|---|---|---|
| 1,035,839 | 8/1912 | Anderson | |
| 2,187,799 | 1/1940 | Bauchman | 34/34 |
| 2,808,333 | 10/1957 | Mickus et al. | 99/80 |
| 2,992,921 | 7/1961 | Bardet et al. | 99/80 |
| 3,258,342 | 6/1966 | Normand | 99/80 |
| 4,125,945 | 11/1978 | Westelaken | 34/65 |
| 4,141,155 | 2/1979 | Benzon | 34/54 |

OTHER PUBLICATIONS

Kunze et al.-Relative Humidity Changes that Cause Brown Rice to Crack-ASAE, vol. 8, No. 3, pp. 396-399, 1965.
Kunze et al.-Moisture Adsorption Characteristics of Brown Rice, ASAE, vol. 10, No. 4 pp. 448-450, 453, 1967.
Berico Industries, "Rice Dryers", 4 page sales brochure.
J. D. Ponting et al., "Temperature and Dipping Treatment Effects on Drying Rates and Drying Times of Grapes, Prunes and Other Waxy Fruits", Food Technology, vol. 24, pp. 1403 to 1406, Dec. 1970.
Blount/ferrell-ross, "Concurrent-Flow Grain Dryers", 4 page sales brochure.
"Multi-Pass Drying Ups Yield", Food Engineering, vol. 30, No. 8, Aug. 1958, p. 82.
David L. Calderwood, "Tests of Drying Procedures Using a Commercial Type Rice Dryer", U.S.D.A., Oct. 1965, pp. 87-89.

Primary Examiner—Larry I. Schwartz
Attorney, Agent, or Firm—Phillips, Moore, Lempio & Finley

[57] ABSTRACT

Bulk rice or other cereal grain is rapidly and economically dried with reduced or negligible breakage of individual kernels by alternately subjecting the grain to primary drying airflows during drying periods and less desiccating drying airflows during tempering periods. The airflows during the tempering period are sufficient to prevent the accumulation of free moisture at the set point or hardened starch of the kernels, which moisture accumulation has been found to be a cause of fissuring, while allowing reduction of the moisture gradients built up within the kernels by the preceding drying period. In one form of the invention, the grain is continuously traveled downward within a drying tower in which relatively fast and/or hot primary drying airflows are directed into the grain at vertically spaced apart drying regions and in which relatively slow and/or cooler drying airflows are directed into the grain at tempering locations situated between the primary drying regions.

9 Claims, 7 Drawing Figures

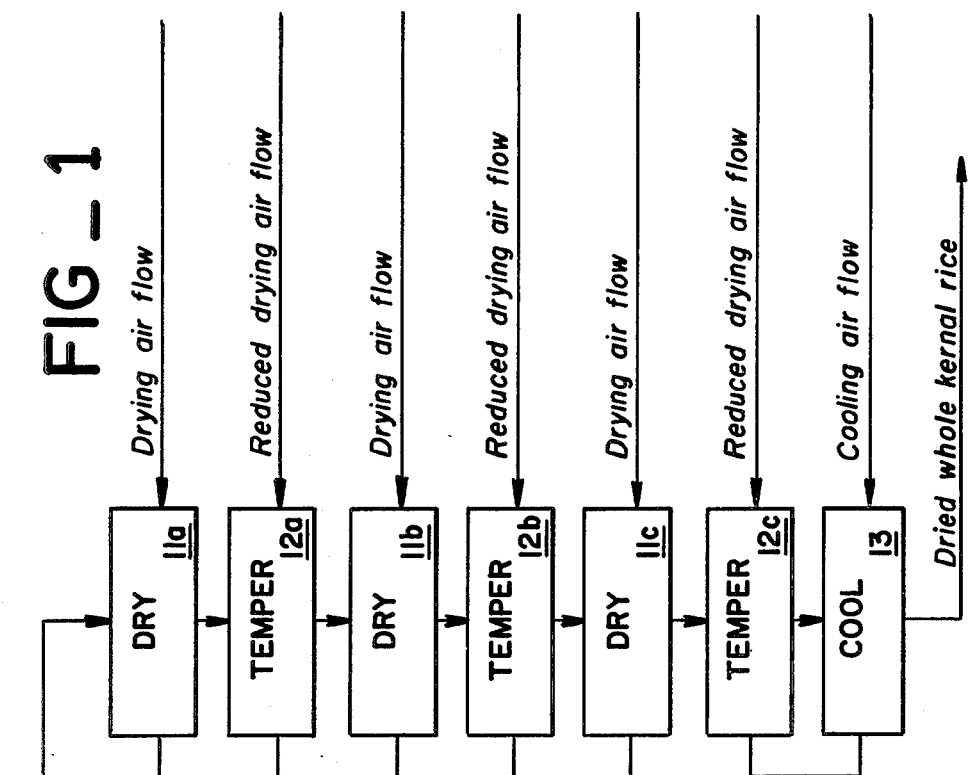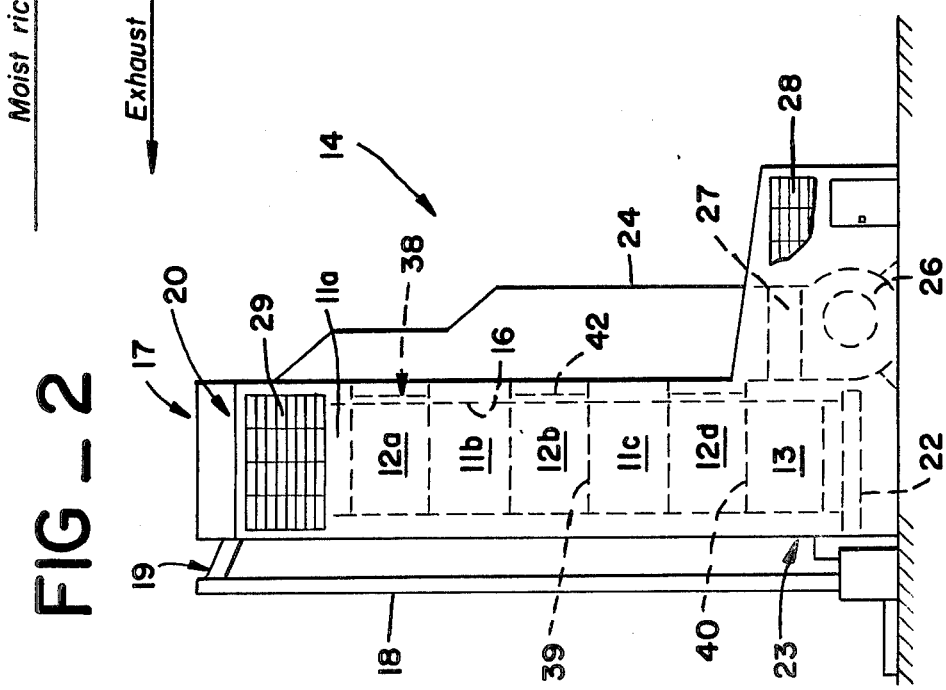

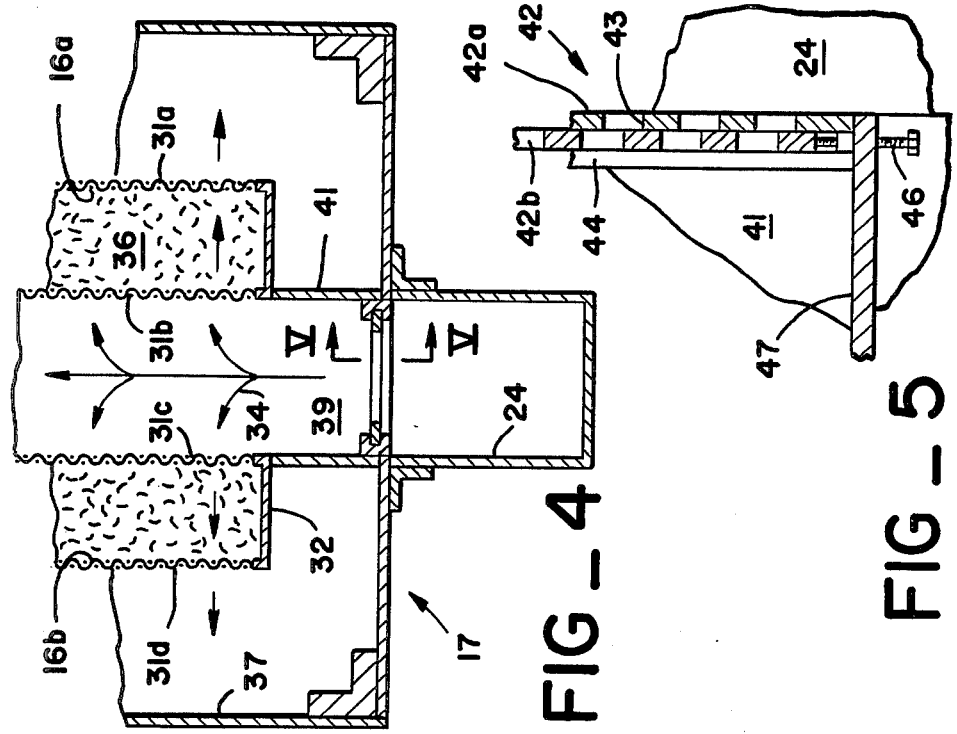
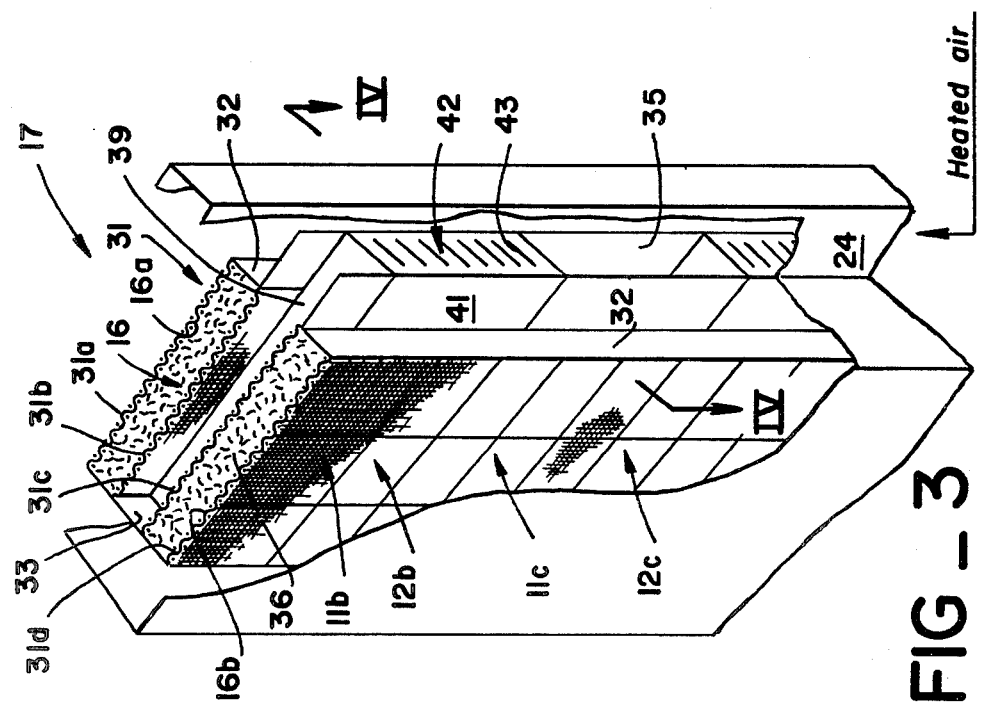

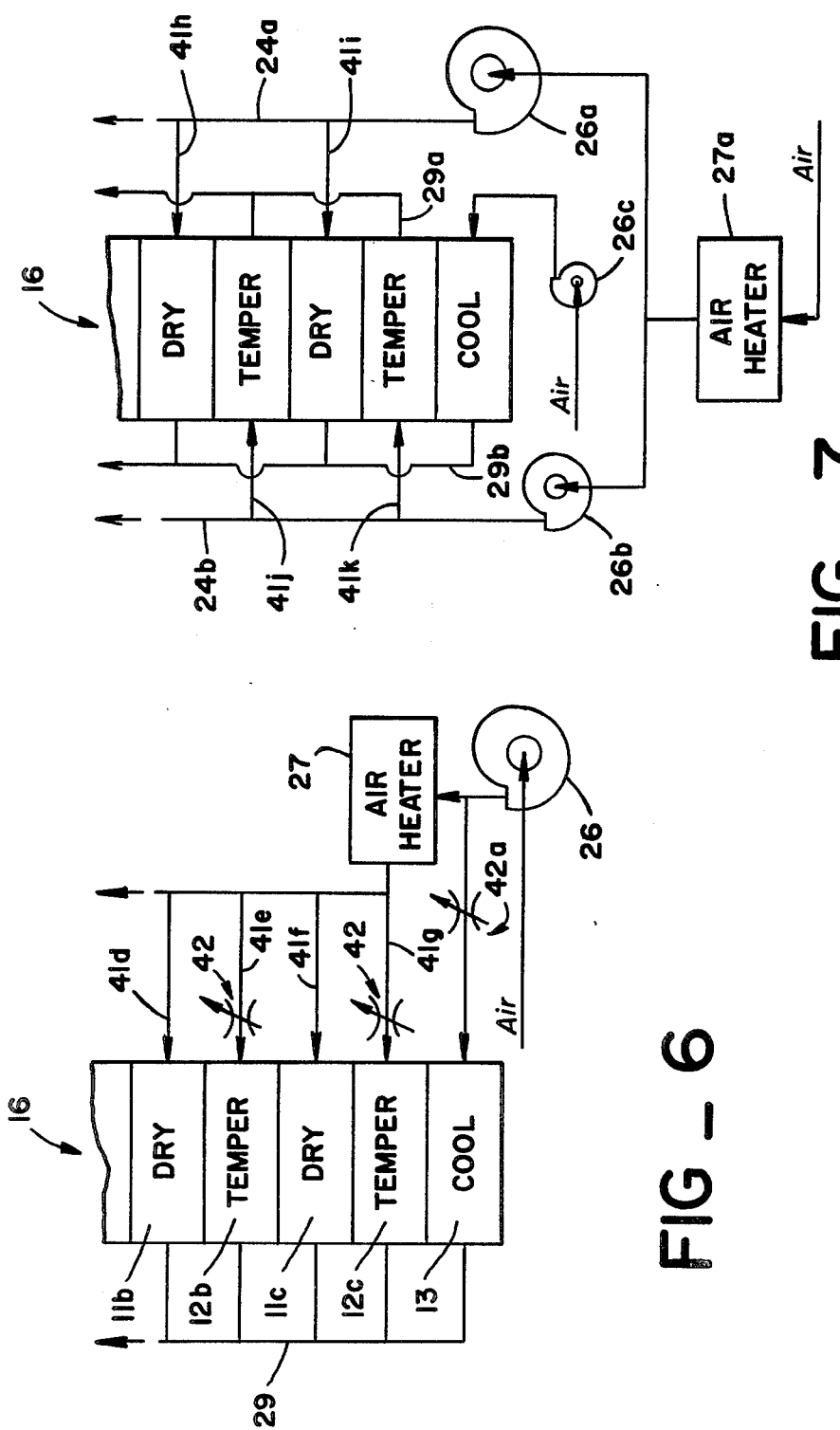

METHOD AND APPARATUS FOR DRYING CEREAL GRAIN

TECHNICAL FIELD

This invention relates to the processing of rice or other cereal grains which contain starches and more particularly to a method and apparatus for more efficiently drying bulk grain or the like while preventing fissuring and consequent breakage of grain kernels.

BACKGROUND OF THE INVENTION

Rice and a variety of other cereal grains may require drying following harvest to enable milling and to provide for storage and subsequent processing without spoilage.

Primitive drying techniques for rice variously included a simple prolonged exposure of the newly harvested grain to the atmosphere or exposure to warm air produced in a fire pit. Such processes typically result in breakage of a very large proportion of the individual kernels. Shattering of the rice may occur during the drying process itself or may take place later during subsequent handling of the grain as a result of fissures or checks produced in individual kernels during the drying operation.

More advanced rice drying techniques reduce the extent of such breakage and thereby provide a more desirable higher quality product. Under current processing procedures, the harvested rice is passed through a drying tower or towers in which it is repetitively subjected to controlled flows of dry heated air. Heretofore successive exposures to the drying airflow have been separated by tempering periods of at least several hours duration during which the drying airflow is absent. Typically the freshly harvested bulk rice is given one pass through a drying tower and then transferred to a tempering bin where it is stored for periods ranging from several hours to a day or more after which the tempered rice is again passed through the same drying tower or another one. The sequence of drying followed by tempering may be repeated a number of times depending on the particular type of rice, moisture content, quality of product to be produced and other factors.

The forced migration of moisture from the interior of the rice kernels to the surface during a period of drying is inherently a slow process. Consequently the surface regions of the kernels are dried more strongly than the interior and a pronounced moisture gradient builds up within each kernel after a period of partial drying. The drying action then becomes less efficient. The tempering periods allow the moisture to redistribute itself within individual kernels thus reducing the moisture gradients. This enables the next period of partial drying to be more effective until such time as the gradients again build up and another period of tempering is needed.

Tempering bins are a costly and bulky addition to the drying installation. In some more recently developed drying facilities, the rice or other grain is traveled through a drying tower in which both the drying steps and the tempering steps are performed, the grain being subjected to a drying flow of warm air at vertically spaced apart regions within the tower which are separated by tempering zones at which there is no significant airflow.

In either type of installation breakage of a substantial portion of the kernels continues to occur either during the drying process or later as a result of fissuring or checking of the kernels brought about during the drying operations. The broken kernel component of the product must then be separated out and sold at a substantially lower price than the whole grain component. The fissuring and consequent breakage of kernels which occurs in the course of currently practiced rice drying techniques very significantly reduces the overall quality of the product and adversely affects the economic return to the growers, processors and marketing organizations.

In addition to the moisture gradient which is built up in the rice kernels following a period of partial drying a substantial thermal gradient is also created. It has heretofore been the assumption in the industry that fissures in rice kernels, which lead to immediate or later breakage, are a result of thermal stresses during drying. Consequently it has also been assumed that the conventional tempering periods are needed not only to allow reduction of moisture gradients but also to reduce heat stress in order to increase the yield of whole kernel rice. As will hereinafter be discussed in more detail these assumptions appear to be erroneous. I have discovered that the undesirably high incidence of kernel breakage under prior practice can be attributed, at least primarily, to a distinctively different cause. As has been pointed out, the prior processing techniques do not in fact avoid a very substantial incidence of fissuring.

Adverse characteristics of rice drying techniques as currently practiced are not limited to the undesirably low yield of whole kernels. It has been pointed out that tempering bins, where they are required, constitute a costly complication in the drying installation and also complicate the handling of the grain. The long periods needed for tempering reduce the rate at which any given installation can process grain. As a practical matter this may have the indirect effect of causing undesirable delays in harvesting in any given rice growing locality. Drying should be performed quickly once the rice has been harvested.

While the background of the invention has been herein discussed with specific reference to the processing of rice, similar problems are sometimes encountered in the processing of other starchy cereal grains such as wheat, barley, corn or oats, among other examples.

The present invention is directed to overcoming one or more of the problems discussed above.

SUMMARY OF THE INVENTION

In one aspect of the present invention, a method of drying cereal grain or the like includes the steps of heating air, directing a first drying airflow of the heated air into the grain during a drying period to extract moisture from the grain at a rate which causes moisture gradients to build up within the individual kernels and then subjecting the grain to a tempering period during which moisture gradients reduce within the individual kernels of the grain. Drying is continued at a redued rate during the tempering period by directing a less desiccating second airflow of heated air into the grain during the tempering period, the second airflow being sufficiently less dessicating than the first airflow to enable reduction of the moisture gradients while being sufficiently dessicating to inhibit accumulation of moisture at the outer portions of the kernels as the moisture gradients reduce. The continued drying at a reduced rate is initiated before any substantial reduction of the moisture gradients takes place within the kernels.

In another aspect the invention provides apparatus for drying cereal grain or the like which includes a drying tower having spaced apart vertically extending porous screens forming a grain chamber and including means for receiving the grain at an upper portion of the chamber and means for removing the grain from the lower portion of the chamber, heating means for producing heated air, flow means for directing separate heated air flows from the heating means across the chamber through the screens at each of a plurality of vertically distinct regions of the chamber, and means for causing the heated airflows to be less desiccating within alternate ones of the regions than in the others of the regions.

By continuing drying during the tempering periods but at a reduced level relative to the primary drying periods, the invention greatly increases whole kernel yields. Under at least some conditions, damaging fissuring of grain may be substantially eliminated. The invention also enables a substantial shortening of overall processing times in part because drying may be continuous and in part because it becomes possible to use higher drying air temperatures and/or flow rates than have heretofore been considered advisable. Thus the invention provides for the drying of rice or other starchy grain very rapidly and economically while providing a superior product.

The invention, together with further objects and advantages thereof, will be further understood by reference to the accompanying drawings and the following description of detailed examples.

BRIEF DESCRIPTION OF THE DRAWINGS

In the accompanying drawings:

FIG. 1 is a process diagram illustrating steps which may be employed in the practice of an embodiment of the invention;

FIG. 2 is a side elevation view of a drying installation in accordance with one embodiment of the invention;

FIG. 3 is a broken out perspective view of a portion of the drying installation depicted in FIG. 2;

FIG. 4 is a partial plan section view of the drying installation of FIG. 3 taken along line IV—IV thereof;

FIG. 5 is a cross section view of a portion of the structure shown in FIG. 4 taken along line V—V thereof;

FIG. 6 is a schematic diagram of an airflow system for the drying installation of FIGS. 2 to 5; and FIG. 7 is a schematic diagram of another airflow system which may also be employed in the practice of embodiments of the invention.

DETAILED DESCRIPTION OF PREFERRED EMBODIMENTS OF THE INVENTION

Freshly harvested rice, commonly referred to as paddy rice or field rice, typically has a moisture content of around 24% although this may vary considerably depending on the variety, the degree of maturity of the rice plants and on weather conditions preceding harvest. The rice is quickly dried following harvest in order to stop undesirable processes such as fermentation, germination and bacteria growth which occur in the presence of moisture. Drying also hardens the hulls and kernels in preparation for milling or removal of the hulls and, in the case of white rice, removal of the outer or bran layer of the kernels as well. During the drying step, the moisture content of the rice is typically reduced to about 12% as rice is considered to be adequately dried for most purposes when at or below that moisture level.

Referring now to FIG. 1 of the drawings, a drying process in accordance with the present invention includes at least one period of drying 11a followed by at least one period of tempering 12a during which drying is continued but at a reduced level.

During the drying step 11a, a first drying airflow is directed through the mass of rice to extract moisture from the individual kernels through the hulls. The air flows through the interstices between kernels in the mass of grain and in the process draws moisture from within the surface regions of the kernels at a rate greater than such moisture can be replenished by outward migration of moisture from the more interior region of the kernels. Consequently a moisture gradient is established within each kernel. After a period of drying 11a, the outer regions of the kernels contain less moisture than the inner regions. The rate of drying and thus the rate of buildup of the moisture gradients is dependent on both the rate of airflow through the grain and on the temperature of the input airflow. Higher input air temperatures or higher flow rates act to extract moisture faster although there is not a constant relationship between temperature or airflow rate and the rate of moisture extraction since the moisture extraction rate tends to decrease as the drying period 11a progresses. As has been pointed out, moisture from the more interior regions of the kernels cannot migrate outwardly at a rate sufficient to replace the moisture extracted from the outer parts by the drying airflow.

Thus the rate of drying during the drying step 11a can be regulated by controlling either the temperature of the air or the rate of airflow through a unit volume of the grain or by a combination of both techniques. An increase in either the temperature or flow rate increases the drying or dessicating effect of the flow on the grain.

Air and grain temperature within the mass of grain is not necessarily the same as the air temperature at the output of the heater which supplies the airflow. The moisture extraction is accompanied by evaporative cooling of the flow within the grain mass. It is the practice in the industry to monitor the surface temperature of the grain during drying and to adjust the heater as might be necessary to maintain the desired grain temperature. Thus references to temperature values and ranges herein should be understood to refer to grain temperatures rather than to air temperatures within or at the output of the heater which supplies the airflow although changes in grain temperature are realized by adjustment of the heater.

In the practice of the present invention grain temperatures may, if desired, be substantially higher than has heretofore been considered advisable from the standpoint of avoiding heat induced damage to the rice. In the prior practice grain temperatures have typically been in the range from about 90° F. to about 100° F. (32° C. to 38° C.) during drying. Similar temperatures may be employed in the practice of the present invention but it is also possible and often preferable to utilize temperatures up to about 130° F. (54° C.) in order to reduce processing time. The duration of each drying step 11a is dependent on the degree of moisture reduction which is desired during each such step. As the efficiency of drying falls off during a period of drying as previously descussed, it is preferable to reduce surface moisture about 2% in each individual drying step 11a while repeating such steps the necessary number of times to accomplish the desired overall moisture reduction. In an installation of the form hereinafter described, a 2% surface moisture reduction may, under many conditions, be accomplished in from about 10 minutes to about 20 minutes although other time periods may be suitable depending on such variables as initial moisture content, grain variety and degree of maturity and others. These temperatures and times represent preferred process conditions but should not be considered to be limitative as operation outside of these values may be appropriate under some circumstances.

After the efficiency of the drying action decreases as discussed above, the rice is subjected to the tempering step 12a. The tempering step 12a provides time for the migration of moisture from the interior regions of the kernels to the outer regions or, in other words, for reduction of the built up moisture gradients within the individual kernels.

The present invention differs from the prior art in that forced drying is continued during the tempering step 12a. A second airflow is passed through the grain during the tempering period 12a but it is less dessicating than the airflow during the drying period 11a. The second airflow is made less dessicating either by establishing a relatively low grain temperature by adjustment of the input air temperature or by employing a relatively low flow rate, or by a combination of such steps. Flow rate regulation is in most cases the preferred technique as it enables more effective control of the degree of drying. Also many drying installations have only a single heated air source.

Tempering as practiced in the prior art involves a rise of moisture content at the outer regions of the kernels as moisture from the interior of the kernels migrates outwardly to reduce the gradient. In some instances there may be an actual accumulation of free moisture at the surface of the kernels within the hulls particularly if the hulls are loose. In the present invention the flow rate and/or input temperature of the second airflow, during the tempering period 12a, are selected to minimize or avoid an increase in moisture content at the outer regions of the kernels during tempering and particularly to prevent the accumulation of free moisture at or under the hulls. This can be accomplished with an airflow that has a drying effect insufficient to prevent the desired reduction of moisture gradients within the kernels during tempering.

In other words, in conventional practice the moisture gradient reduction during tempering involves a decrease in moisture at the center of the kernel that is accompanied by a rise of moisture level at the surface. In the practice of the present invention, the low end of the gradient at the surface of the kernels is held at a relatively low value while the high end of the gradient reduces.

If the input airflow temperature during the tempering step 12a is similar to that employed in the drying step 11a, then airflow rates of about 30% to about 50% of the flow rates employed in the drying stage 11a are typically suitable for the tempering stage 12a although the limits of the tempering flow rate range are subject to variation dependent on such factors as the initial moisture content and variety of the rice and may need to be adjusted empirically for any given batch of rice under a particular set of conditions. The duration of the tempering step 12a may be the same as that of the drying step 11a in many cases although the time may be varied if it is observed that the desired degree of moisture gradient reduction does not occur in that time.

A tempering period 12a of the type described above reduces and in some cases practically eliminates fissuring or checking of the rice kernels of the damaging kind which can result in kernel breakage. Thus the process is of value even in instances where the rice is subjected only to a single drying step 11a because only a minor degree of moisture reduction is required. More typically and notably in the case of the drying of paddy or field rice, a repetitive series of drying periods 11a, 11b, 11c alternating with plural tempering steps 12a, 12b and 12c are employed. Excellent results are achieved if about 2% of the total original moisture content of the rice is removed during each individual drying period 11 and following tempering period 12. Thus if the field rice initially has a moisture content of 24% and it is desired to dry the rice to a moisture content of about 12%, then six drying periods 11 may be alternated with six tempering periods 12 to accomplish the desired results. Other numbers of drying and tempering steps may be appropriate in many cases.

The final tempering period 12c may be followed by a cooling step 13 in which a relatively cold airflow is directed through the grain.

The product of the above described method is dried whole kernel rice of high quality which exhibits little or virtually no damaging fissuring of the kind which can cause breakage. Owing to the continuation of a degree of drying during the tempering periods 12 and also to the higher grain temperatures which may be employed without damage to the rice, overall processing time may be reduced and the productivity of drying installations may be increased.

These results are at variance with the conventional assumption that damaging fissuring is initiated during drying periods as a result of heat induced stresses. It can easily be demonstrated that factors other than heat stress are involved in fissuring. As a simple example, dried rice of uniform temperature throughout may be immersed in water which is of exactly the same temperature. There are no thermal differentials present but the rice fissures extensively and soon reduces to a paste. Moisture, rather than thermal gradients, triggers such fissuring.

I have ascertained that damaging fissuring arises during tempering as heretofore practiced, rather than in the drying stage as previously supposed. Fissuring appears to be a natural genetically determined reaction of the rice seed to certain moisture conditions which have heretofore been artificially imposed on the rice during the tempering periods.

In the early stages of the natural life cycle of the rice plant, the kernels or seeds receive nutrients and moisture through the panicle or flower head. The bran or outer layer of the kernel distributes such moisture efficiently to the cells of all portions of the kernel and moisture content remains high during the growing period and early maturity. During late maturity, under natural conditions, the inflow of moisture from the panicle diminishes and may eventually cease. A slow natural drying of the kernels then takes place. Fissuring or checking may be observed at this stage but the fissures are shallow and of small size and are not of the damaging type which may cause breakage. If unharvested, the dried rice kernels are eventually released from the plant in an essentially dormant or hibernating condition and remain in that state until such time as sufficient water becomes available to penetrate into the interior of the kernel.

It is believed that fissuring is a natural reaction of dried or partially dried rice to the presence of water and one which serves to facilitate germination and growth by providing a route for water to penetrate into the interior of the seed.

Rice like other cereal grains, contains much starch. It has been recognized in the art that as the drying of rice proceeds the starch content passes through a set point at about 15% moisture, at which the starch sets or undergoes a pronounced change which includes hardening.

I have found that major fissuring results from a reaction between free moisture and starch that has previously dried down through the set point. Hardened starch cannot swell and absorb incoming moisture. Instead, it fissures. This may be a natural mechanism for admitting sizeable amounts of exterior moisture into the interior of the kernel when conditions are right for germination. Upon germination, enzymes convert the starch into sugars involved in plant growth and moisture is required for the process to proceed.

The above described circumstances which produce major fissuring have heretofore been imposed on a sizable proportion of the rice kernels during commercial processing. As the initial drying action primarily affects the outer regions of the kernel the outer portions of the starchy content of the kernel quickly pass through the set point and harden. The more interior portions remain relatively moist at this stage. During the following period of tempering, as heretofore practiced, the moisture content of the outer region of the kernel actually rises as moisture migrates outwardly from the inner region. The hardened starch at the outer region of the kernel may then respond to this rise of moisture by fissuring.

During processing techniques as heretofore practiced, some kernels fissure and then break while others do not. Investigations in connection with the present invention indicate that it is primarily kernels having loose hulls that undergo serious fissuring during processing as previously practiced. It appears that if the hull of the rice is still closely adhered to the kernel during the conventional tempering periods the hull exerts a wicking action which is generally sufficient to prevent accumulation of substantial amounts of free moisture at the starch which has passed through the set point. Thus a tight hull tends to prevent the conditions which cause serious fissuring during conventional tempering. If the hull is loose in whole or in part it has an opposite effect. It may then create a moisture trapping pocket against the exterior of the kernel which promotes serious fissuring. Unfortunately, a sizable proportion of the kernels in any given batch of rice are likely to have loose hulls.

The method of the present invention may now be understood as one in which serious fissuring is avoided by preventing a damaging accumulation of moisture at the outer hardened region of the kernel during the tempering stages 12. The drying airflows during the tempering steps 12 of the present invention are sufficiently dessicating to extract such moisture but do not prevent the desired reduction of the moisture gradient during tempering.

An additional benefit is a reduction of overall processing time arising in part from the fact that forced drying is continued, at a reduced level, during the tempering periods. Further, since fissuring is not in fact a result of temperature gradients during the drying stages 11, higher temperatures may be employed if desired in the drying step thereby further shortening overall processing time.

While the invention in its broadest aspects may be applied to drying of rice on a batch basis it is usually more efficient to employ one or more drying towers of the type in which rice is continuously fed into the top of the tower and then progresses downwardly through a drying zone and is continuously removed at the bottom of the tower. Certain existing drying installations of this kind may be used to practice the invention, for example by repetitively passing the rice through the drying zone of such a tower while varying the drying airflow during alternate passes in the manner hereinbefore described.

Referring now to FIG. 2, the method may be more efficiently practiced with a novel drying installation 14 specifically designed for the purpose. Such an installation 14 may include means for defining a vertically extending processing chamber 16 within a drying tower building 17. A bucket elevator 18 may, for example, extend upward adjacent the tower 17 to provide means 19 for continuously delivering grain to the upper portion 20 of the tower although other known forms of grain conveyor may also be employed for the purpose. A horizontally extending screw conveyor 22 at a lower portion 23 of the tower, below processing chamber 16, serves to continuously remove the dried grain from the processing chamber.

An air supply duct 24 for the drying airflow extends upwardly along an endwall of the drying tower 17. At the lower portion 23 of the tower a large air blower or pump 26 directs a flow of air into the base of air supply duct 24 through an air heater 27, the air blower being of the known form at which blower speed may be adjusted to enable selection of a desired rate of airflow. Heater 27 may be of the known form which may be adjusted to adjust the temperature of the air supplied to duct 24. A louvered gridwork 28 in the wall of the lower portion 23 of the tower provides for the intake of air by blower 26 and a similar louvered gridwork 29 at the upper portion 19 of the tower provides for the exhaust of the airflow in this example. The installation 14 may, if desired, also include means for removing pollutants from the exhaust airflow and means for recirculating some or all of the exhaust airflow to the intake of blower 26 in order to conserve heating fuel, suitable structures for this purpose being known to the art.

Referring now to FIG. 3, the processing chamber 16 within the tower 17 may be defined by spaced apart parallel vertically extending assemblies of screens 31 between which the rice or the like travels downwardly during processing, the screens being porous to transmit airflows but having a mesh size sufficiently small to retain the rice. Solid endwalls 32 extend between the screens 31 at each end of the processing chamber 16. This particular example of the invention is of the form having four spaced apart assemblies of screens 31a, 31b, 31c and 31d in order to provide a two channel processing chamber 16 in which one channel 16a is separated from the other channels 16b by an air inflow region 33. As depicted by arrows 34 in FIG. 4 the heated dry air from air channel duct 24 flows into the region 33 and then divides to flow outwardly in opposite directions through the two processing chamber channels 16a and 16b including through the rice 36 or the like which is passing downward through the processing chamber channels. The air then travels upward between the outermost screens 31a and 31b and the walls 37 of tower 17 to the exhaust louvers 29 depicted in FIG. 2. The processing chamber 16 need not necessarily have the divided two channel construction of this embodiment although it is advantageous. The invention may also be utilized in drying installations having a single pair of spaced apart screens defining a single flow channel or in installations having other screen arrangements known to the art.

The drying installation 14 differs from prior constructions in that air flow producing means 38 are provided for directing differing airflows through the screens 31 and the grain 36 at successive different portions of the grain flow path within processing chamber 16. In particular, in this example, spaced apart horizontal partitions 39 effectively divide the processing chamber 16 into a plurality of primary drying regions 11a to 11c and a plurality of tempering regions 12a to 12c the tempering regions being alternated with the drying regions along the grain flow path. A cooling region 13 at the lower end of the processing chamber 16 is similarly established below the final tempering region 12 by another partition 40.

In this example seven partitions 39 are provided to establish three drying regions 11a, 11b and 11c and three tempering regions 12a, 12b, 12c in accordance with the method as depicted in FIG. 1. This is an advantageous division of the processing chamber 16 in that it enables drying of field rice in two passes through the processing chamber 16 or by sequentially passing such rice through two adjacent processing chambers of this kind. Smaller or larger numbers of the primary drying regions 11 and tempering regions 12 may also be provided by utilizing a different number of partitions 39.

FIG. 3 depicts a representative portion of the drying tower 17 in greater detail, specifically the portion which includes a lower part of primary drying region 11b, tempering region 12b, primary drying region 11c and tempering region 12c. The horizontal partitions 39 are situated in the air inflow region 33 between the two inner screen assemblies 31b and 31c with ones of the partitions being at the top and bottom of region 33 and also between each primary drying region 11 and tempering region 12 to form a separate air inflow passage 35 at each such region. One of a plurality of rectangular inlet ducts 41 communicates each air inflow passage 35 with air supply duct 24 to transmit separate portions of the heated airflow into the inflow passages 35.

In accordance with the method as hereinbefore described, the airflows transmitted into the tempering regions such as regions 12b and 12c should be less dessicating than the airflows transmitted into the primary drying regions such as regions 11b and 11c. In the present installation 14 this is done by providing different airflow rates into the two types of region. Means for maintaining the rate of airflow into the tempering regions 12b and 12c below the flow rate into the primary drying regions 11b and 11c in this example includes slotted baffles or panels 42 situated in the ones of the airducts 41 which transmit air from supply duct 24 into the tempering regions in particular. The slotted panels 42 in effect, provide a flow constriction within the airflow paths into the tempering regions 12 relative to the flow paths into the primary drying regions 11 as provided by the unobstructed ones of the airducts 41.

The several slots 43 of each panel 42 may have a fixed predetermined total area to provide the desired rate of airflow into the tempering regions but it is preferable to provide for adjustment of the degree of flow constriction at each such panel. This facilitates changes in the rate of flow into the tempering regions 12, relative to the flow into the primary drying regions 11, to accommodate to the characteristics of different batches of rice or to other variations in process conditions. Adjustability also enables selective variation of the rate of flow into each tempering section 12 relative to the other tempering sections which may be advantageous in some cases in order to adjust to the progressively decreasing moisture content of the rice as it progresses downward in the tower. As depicted in FIGS. 4 and 5, the panel assemblies 42 may each include a fixed front panel 42a adjacent air supply duct 24 and having spaced apart parallel slots 43. A second similar panel 42b may be disposed against the opposite side of panel 42a and is slideable in a vertical direction along guides 44 to vary the effective size of the flow path between supply duct 24 and the associated one of the tempering region inlet ducts 41. Threaded bolts 46 engaged in the floor member 47 of the inlet duct 41 bear against the underside of slideable panel 42b and may be turned to position the slideable panel at a selected vertical position relative to panel 42a. Other means of adjusting the flow rate between supply duct 24 and the inlet ducts 41, such as adjustable louvers, may also be employed.

While this example of the invention utilizes the flow adjusting panel assemblies 42 only at the airflow inlets to the tempering regions 12 of the processing chamber 16, similar flow adjustment means may also advantageously be provided at the inlet ducts 41 which transmit airflow to the primary drying regions 11 in which case the flow adjustment means of the primary drying regions are normally opened more widely than the similar means at the tempering regions.

The drying airflow circuit of the embodiment of the invention of FIGS. 2 to 5 is depicted schematically in FIG. 6. In particular, blower 26 forces a flow of air through air heater 27 and then into the hot air supply duct 24. A first group of the air inlet ducts 41, including ducts 41d and 41f of FIG. 6, transmit a portion of the hot airflow through the primary drying regions such as 11b and 11c and thus constitute first flow producing means for directing first drying airflows into the grain within the drying regions 11. A second group of the air inlet ducts 41 including the ducts 41e and 41g of FIG. 6 transmit other portions of the airflow from heater 27 through the tempering regions 12 of the processing chamber 16 and include flow restrictions 42 thus constituting second flow producing means for directing second less dessicating airflows into the tempering regions 12.

Airflow through the grain within the cooling region 13 at the base of the processing chamber 16 may be taken directly from the output of blower 26 through flow rate adjustment means such as another adjustable panel assembly 42a of the general type hereinbefore described.

Referring now to FIG. 7 other flow arrangements for accomplishing similar results may also be utilized. In the modified airflow circuit depicted in FIG. 7 separate air blowers 26a and 26b are provided to supply the drying regions 11 and the tempering regions 12 respectively. In particular a first air blower 26a draws air through a first air heater 27a and directs such air into a first hot air supply duct 24a. Inlet ducts 41h and 41i transmit portions of the airflow from supply duct 24a to the primary drying regions 11 of the processing chamber 16. The second air blower 26b also draws hot dry air from heater 27a but delivers such air to a second supply duct 24b which may be located on the opposite side of the processing chamber 16 from the first supply duct 24a. A second group of inlet ducts 41j and 41k direct a portion of the airflow from second supply duct 24b into each of the tempering regions 12 of the processing chamber 16. The second air blower 26b is either smaller than the first blower 26a or operated at a slower speed so that the drying airflows into the tempering regions 12 are slower and less dessicating by the desired amount than the airflows into the primary drying regions 11. As the airflows produced by both the first air blower 26a and second air blower 26b are already heated in this embodiment, a smaller third air blower 26c may be used to provide the airflow for cooling region 13.

OPERATION

In the operation of the drying installation depicted in FIGS. 2–6, with reference initially to FIG. 2 in particular, rice or other grain to be dried is continuously fed into the top of the processing chamber 16 by elevator 18 and then travels relatively slowly downward through the sequence of primary drying regions 11 and tempering regions 12 and finally the cooling region 13 as the dried and cooled product is continuously removed at the base of the chamber by screw conveyor 22. During such processing, blower 26 operates continuously to force a flow of drying air upwardly to air heater 27 and into supply duct 42.

Referring now to FIG. 3 in particular, portions of the flow of heated air within supply duct 24 enter the passages 35 of each of the tempering regions 11 through the associated ones of the air inlet ducts 41. At each such primary drying region 11, the airflow then travels outwardly through screens 31 and the portions of the grain 36 which are passing downward through each such region within the two grain flow channels 16a and 16b defined by the screens. Consequently a partial drying of the rice occurs at each such primary drying region 11. As the outer regions of the rice kernels dry more quickly than the inner regions, a moisture gradient is built up in each kernel and the efficiency of the drying action drops off as any given portion of the rice travels downwardly in a given one of the primary drying regions 11. Such moisture gradients are reduced or eliminated as the rice travels downwardly through the subjacent one of the tempering regions 12 so that when the rice reaches the next primary drying region 11 the efficiency of drying is again at a high level.

At each of the tempering regions 12, drying continues but at a substantially reduced level as the airflows into the air chambers 33 at the tempering regions 12 through the associated inlet ducts 41 are reduced by the slotted panel assemblies 42. The degree of flow restriction introduced by the panels 42 is selected to produce a rate of drying airflow through the grain 36 at the tempering regions 11 which is sufficiently low to allow the desired reduction of moisture gradients but which is still sufficient to prevent a moisture accumulation at the outer regions of the rice kernels in the course of the gradient reductions. Fissuring of the grain is reduced or substantially eliminated and the dried grain which is removed from the bottom of the processing chamber 16 includes little or no broken kernels or seriously fissured kernels of the kind which might shatter during subsequent processing.

The rate at which the rice 36 is travelled downwardly through the processing chambers 16 may be determined in accordance with the method of the invention as hereinbefore described, taking into account the dimensions of the particular processing chamber 16 and the capacities of the particular blower 26 and heater 27. However, in general, the time required for the drying of a particular batch of rice or the like may be substantially shortened relative to conventional practice in part because higher grain temperatures may be employed without concern about fissuring and in part because drying continues during the tempering period. The method in its preferred forms may, in fact, be regarded as one of continuous drying of the rice from the starting moisture content down to the final dried product but in which the level or intensity of drying is alternately reduced and increased.

Operation of the variation of the drying installation depicted schematically in FIG. 7 may be essentially similar except insofar as the difference in the rate of flow of drying air through the tempering regions 12 relative to the flow through the drying regions 11 is established by the different flow capacities of the two air blowers 26a and 26b and/or by causing such blowers to operate at different speeds.

While the invention has been described with respect to certain specific preferred examples, many variations are possible and it is not intended to limit the invention except as defined in the following claims.

I claim:

1. In a method of drying cereal grain or the like which includes the steps of heating air, directing a first drying airflow of the heated air into the grain during a drying period to extract moisture from said grain at a rate which causes moisture gradients to build up within the individual kernels of said grain and thereafter subjecting said grain to a tempering period during which said moisture gradients reduce within the individual kernels of said grain, the improvement comprising:
    continuing drying of said grain at a reduced rate during said tempering period by directing a less desiccating second airflow of said heated air into said grain during said tempering period, said second airflow being sufficiently less desiccating than said first airflow to enable reduction of said moisture gradients while being sufficiently dessicating to inhibit accumulation of moisture at the outer portions of said kernels as said moisture gradients reduce, including initiating said continued drying at a reduced rate before any substantial reduction of said moisture gradients takes place within said kernels.

2. The method of claim 1 wherein the rate of flow of said second airflow of said heated air through said grain is from about 30% to about 50% of the rate of flow of said first airflow of said heated air through said grain.

3. A method of drying bulk cereal grain or the like comprising the steps of:
    heating air,
    repetitively directing primary drying airflows of said heated air into said bulk grain during a plurality of drying periods at a rate which causes moisture gradients to build up within the individual kernels of said grain,
    repetitively tempering said bulk grain during a plurality of tempering periods during which said moisture gradients are reduced, said tempering periods being alternated with said drying periods, and subjecting said bulk grain to additional drying airflows of said heated air during each of said tempering periods before any substantial reduction of said moisture gradients has taken place, said additional drying airflows being sufficiently less desiccating than said primary drying airflows to enable reduction of moisture gradients within individual kernels of said grain during said tempering periods while being sufficiently desiccating to prevent accumlation of moisture at the outer portions of said kernels as said moisture gradients reduce.

4. A method of drying bulk cereal grain or the like comprising the steps of:
repetitively subjecting said bulk grain to primary drying airflows during a plurality of drying periods,
repetitively tempering said bulk grain during a plurality of tempering periods, said tempering periods being alternated with said drying periods,
subjecting said bulk grain to additional drying airflows during said tempering periods, said additional drying airflows being less desiccating than said primary drying airflows,
continuously passing said grain downward through a drying tower during said drying periods and tempering periods,
passing said primary drying airflows through said grain at vertically spaced apart regions of said tower,
passing said additional drying airflows through said bulk grain at locations between said vertically spaced apart regions of said tower,
producing a flow of heated air,
producing said primary drying airflows by directing first portions of said flow of heated air through said grain, and
producing said additional drying airflows by directing other portions of said flow of heated air through said grain at slower rates of flow.

5. Apparatus for drying cereal grain or the like comprising:
a drying tower having spaced apart vertically extending porous screens forming a grain chamber and including means for receiving said grain at an upper portion of said chamber and means for removing said grain from the lower portion of said chamber,
heating means for producing heated air,
flow means for directing separate heated airflows from said heating means across said chamber through said screens at each of a plurality of vertically distinct regions of said chamber, and
means for causing said heated airflows to be less desiccating within alternate ones of said regions than in the others of said regions.

6. The apparatus of claim 5 wherein said flow means includes at least one air supply duct extending along said chamber and being communicated with said heating means to receive heated air therefrom, and a plurality of vertically spaced apart partitions extending between said screens and said air supply duct.

7. The apparatus of claim 5 further including an air blower coupled to said heating means, an air supply duct connected to said air blower and heating means for receiving the airflow therefrom, and a plurality of air inlet ducts each being connected between said air supply duct and a separate one of said regions of said grain chamber, and means for reducing the rate of air flow through alternate ones of said air ducts relative to the others thereof.

8. The apparatus of claim 5 further including first and second air blowers coupled to said heating means, first and second air supply ducts connected to said first and second air blowers respectively, a first plurality of air inlet ducts connected between said first air supply duct and said alternate ones of said plurality of regions of said grain chamber, and a second plurality of air inlet ducts connected between said second air supply duct and said others of said plurality of regions of said grain chamber.

9. The apparatus of claim 8 wherein said first and said second air supply ducts extend vertically along opposite sides of said grain chamber.

* * * * *